P. S. GRAVES & J. I. OLLIVETTI.
DRINKING GLASS HOLDER FOR STERILIZERS.
APPLICATION FILED SEPT. 24, 1914.
1,161,657.
Patented Nov. 23, 1915.
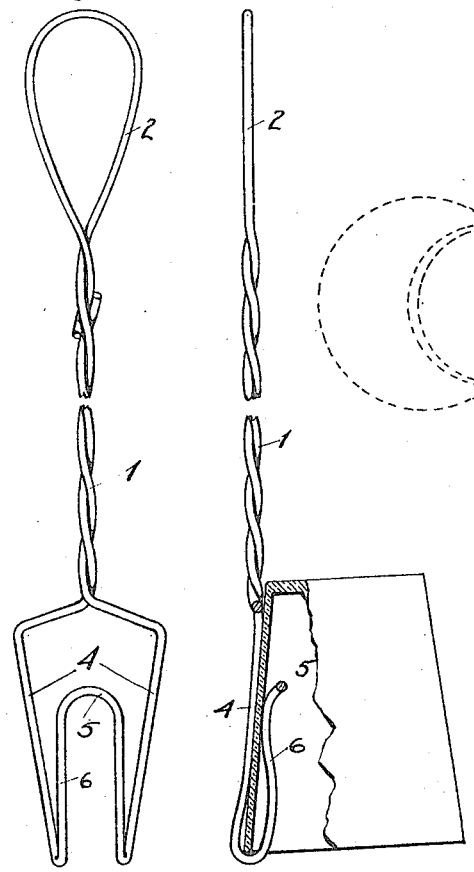
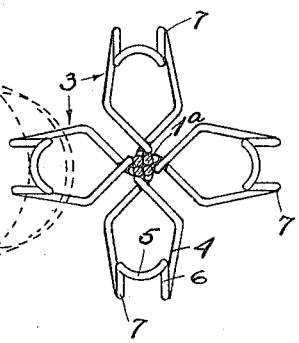
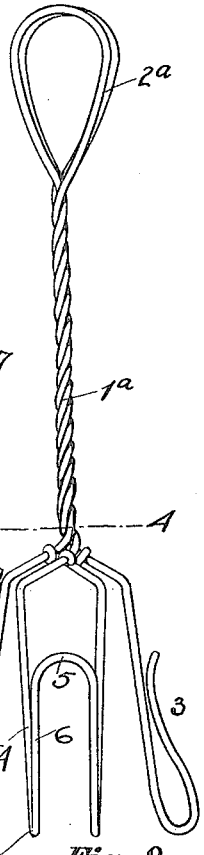
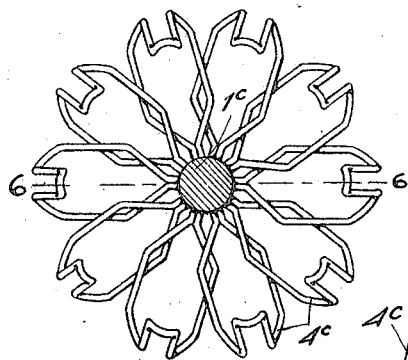
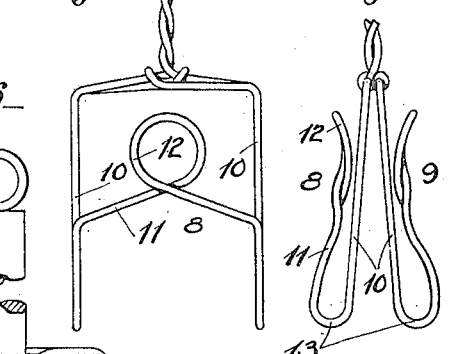
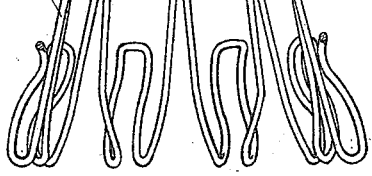
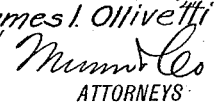
WITNESSES
Frank C. Palmer.
C. Bradway.
INVENTORS
Peter S. Graves,
James I. Ollivetti
BY
Munn & Co.
ATTORNEYS
COLUMBIA PLANOGRAPH CO., WASHINGTON, D. C.

UNITED STATES PATENT OFFICE.

PETER S. GRAVES AND JAMES I. OLLIVETTI, OF PLATTSBURG, NEW YORK.

DRINKING-GLASS HOLDER FOR STERILIZERS.

1,161,657.

Specification of Letters Patent.

Patented Nov. 23, 1915.

Application filed September 24, 1914. Serial No. 863,289.

*To all whom it may concern:*

Be it known that we, PETER S. GRAVES and JAMES I. OLLIVETTI, citizens of the United States, and residents of Plattsburg, in the county of Clinton and State of New York, have invented a new and Improved Drinking-Glass Holder for Sterilizers, of which the following is a full, clear, and exact description.

This invention relates to a holder for supporting drinking glasses while they are in a sterilizer or being placed therein or removed.

The general objects of the invention are to provide a comparatively simple and inexpensive holding device for drinking glasses and the like, whereby they can be easily and quickly placed in or removed from the holder, and by means of the latter easily and quickly placed in or removed from the sterilizing tank for the purpose of sterilizing glasses, the holders preferably being of metal so that they act as conductors which are in contact with the glasses so that the heat is readily conducted away from the latter by the holder and its handle to thereby prevent cracking of the glasses by the intense heat.

Another object of the invention is the provision of a holder made of wire and embodying a novel form of hook on which a glass is suspended in inverted position, there being, according to certain embodiments of the holder, a plurality of hooks which are so disposed with respect to each other that the holder can be set on the bottom of the sterilizing tank and be maintained in upright position, whereby the handle can be readily reached without having to be fished out of the water in the sterilizer, as the holder will be so positioned that the handle will be upright and conveniently grasped when the cover of the sterilizer is removed.

With such objects in view, and others which will appear as the description proceeds, the invention comprises various novel features of construction and arrangement of parts which will be set forth with particularity in the following description and claims appended hereto.

In the accompanying drawing which illustrates certain embodiments of the invention and wherein similar characters of reference indicate corresponding parts in all the views, Figure 1 is a front view of a holder for a single glass; Fig. 2 is a side view with the parts in section and showing a glass hooked on the holder; Fig. 3 is a side view of multiple glass holder; Fig. 4 is a sectional view on the line 4—4, Fig. 3; Fig. 5 is a plan view of a further modification whereby the holder will support ten glasses at a time. Fig. 6 is a vertical sectional view on the line 6—6, Fig. 5; Fig. 7 is a front view of a further modified form of holder; and Fig. 8 is a side view thereof.

Referring to the drawing, and more particularly to Figs. 1 and 2, the glass holder comprises a structure made of a single piece of wire and bent into a twisted shank or handle rod 1 which has a loop handle 2 at the upper end, while at the lower end is a hook 3, such hook being formed into a pair of spaced base members 4 which have connected therewith the U-shaped or looped bill 5, the members 6 of which are respectively connected with the side or base members 4. The parts of the hook are so disposed that when a tumbler is placed therein, as shown in Fig. 2, the members 6 of the bill will engage inside the inverted tumbler while the outside of the tumbler will be in contact with the base members 4. In order to obtain this contact with the tumbler the bill is bent in close proximity to the base members 4, and the bill will be sprung away from said members as the tumbler is placed in position. This firm contact with the tumbler is desirable, as the heat of the tumbler when placed in the sterilizer is rapidly conducted up the handle of the holder, thus preventing cracking of the tumbler. In the construction shown in Figs. 3 and 4 there are four hooks spaced evenly around the axis of a twisted handle 1ª, and the bends of the hooks at 7 all lie in a common horizontal plane so as to form a supporting base whereby the holder can be placed on the bottom of the sterilizing tank and be disposed in an upright position, where the handle or grip 2ª will be uppermost and conveniently within reach when the cover of the sterilizing tank is removed.

In the modification shown in Figs. 5 and 6 the individual hooks are of substantially the same shape as the hooks in the other forms, but the upper portions of the base members 4ᶜ are bent inwardly in a horizontal plane and connect with a central handle 1ᶜ. The glasses are placed on the individual hooks in the usual manner and the hooks all contribute to form a supporting base whereby the holder will be maintained upright when placed in the tank.

The modification shown in Figs. 7 and 8 is especially adapted for supporting other articles than glasses such as, for instance, plates, and oppositely-disposed hooks 8 and 9 go to make up the holder, each hook comprising a pair of base members 10 and a bill consisting of side members 11 connected with the respective base members 10, and the members 11 are connected by a loop 12. It will be understood that the plates will be inserted in the individual hooks and be clamped by the side members 10 and 11. The bends 13 of the hooks lie in a common horizontal plane so that the holder can be stood upright in the tank.

In each of the various forms of the device there are provided four points of metallic contact with the article held thereby and consequently positive safety against cracking or breakage is secured, whether the article be made of glass, crockery or other composition, and the articles can be changed from a boiling temperature to a freezing temperature with absolute safety.

From the foregoing description taken in connection with the accompanying drawing, the advantages of the construction and method of operation will be readily understood by those skilled in the art to which the invention appertains, and while we have described the device which we now consider to be the best embodiment thereof, we desire to have it understood that the device shown is merely illustrative and that such changes may be made when desired as are within the scope of the appended claims.

Having thus described our invention, we claim as new and desire to secure by Letters Patent:

1. An article holder of the class described comprising a handle, and a plurality of hooks carried thereby and symmetrically arranged around the handle as a center, each hook consisting of a pair of base members, and a bill having its side members connected with the base members by bends, all of said bends being in a common plane, the side members of the bill and the base members of each hook coöperating to grip an article.

2. An article holder of the class described comprising a handle, and a plurality of hooks connected therewith, the hooks having base members inclined to and symmetrically disposed around the handle, and bill members connected with the lower ends of the base members by bends, the bends being disposed in a common plane to form a supporting base for maintaining the holder upright, the base and bill members of the hooks being disposed in planes converging upwardly to hold drinking glasses and the like with the brims thereof out of contact with the surface on which the holder rests.

In testimony whereof we have signed our names to this specification in the presence of two subscribing witnesses.

PETER S. GRAVES.
JAMES I. OLLIVETTI.

Witnesses:
W. L. PATTISSON,
JOS. LOATH.

Copies of this patent may be obtained for five cents each, by addressing the "Commissioner of Patents, Washington, D. C."